J. H. WHITE.
NUT LOCK.
APPLICATION FILED OCT. 5, 1912.
1,057,311.
Patented Mar. 25, 1913.
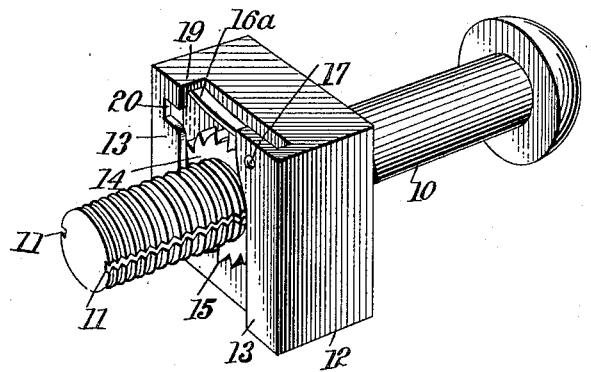
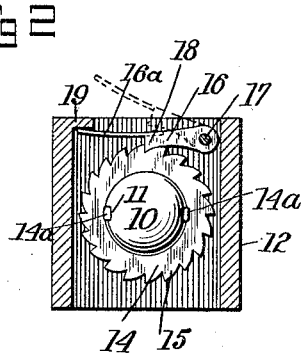
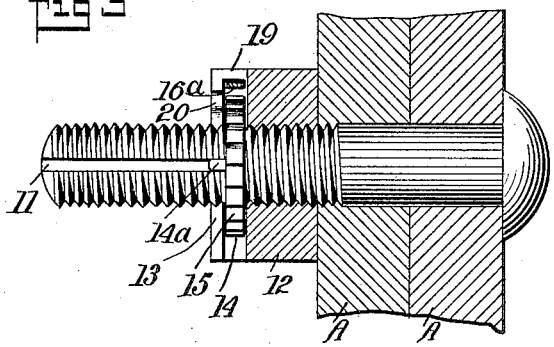
WITNESSES
INVENTOR
JOHN H. WHITE,
BY
ATTORNEYS

UNITED STATES PATENT OFFICE.

JOHN HERMAN WHITE, OF GALLIPOLIS, OHIO, ASSIGNOR OF ONE-HALF TO THOMAS EDVENSON, OF GALLIPOLIS, OHIO.

NUT-LOCK.

1,057,311.   Specification of Letters Patent.   Patented Mar. 25, 1913.

Application filed October 5, 1912. Serial No. 724,074.

*To all whom it may concern:*

Be it known that I, JOHN H. WHITE, a citizen of the United States, and a resident of Gallipolis, in the county of Gallia and State of Ohio, have invented a new and Improved Nut-Lock, of which the following is a full, clear, and exact description.

My invention relates to the class of nut locks employing a ratcheted washer, in connection with a grooved bolt and a nut, and a dog for engaging the teeth of the washer. It is a design of my invention to provide an improved form of nut-locking device of the indicated character.

The invention will be more particularly explained in the specific description hereinafter to be given.

Reference is to be had to the accompanying drawings forming a part of this specification, in which similar characters of reference indicate corresponding parts in all the views.

Figure 1 is a perspective view of a nut lock embodying my invention; Fig. 2 is a front view, with parts of the nut broken away; and Fig. 3 is a side elevation with parts broken away and others in section, showing the invention in connection with two members to be clamped.

In practice, the bolt 10 is adapted to pass through any elements A A to be clamped, and the front threaded end of the bolt is formed with one or more longitudinal grooves 11, preferably two grooves diametrically opposite. The nut 12 has a threaded eye, as usual, to engage the threads of the bolt, and on the front face of the nut there is formed in accordance with my invention, undercut side members at opposite sides, producing overhanging flanges 13. The washer 14 has an eye to receive the bolt, the wall of the eye being formed at opposite sides with inwardly-projecting lugs 14ᵃ to enter the grooves 11, and the periphery of the washer is formed with an annular series of ratchet teeth 15.

A dog 16 is secured to the nut 12 beneath one end of one of the overhanging flanges 13, as by a pin 17, a tooth 18 of the dog being adapted to engage the ratchet teeth 15. A plate spring 16ᵃ is secured to or formed integral with the dog 16, and extends in the direction of the opposite flange 13, and beneath the latter, the free end of the said spring abutting against a wall 19. At a point near the wall 19 adjacent overhanging flange 13 is formed with a notch 20, through which the spring 16ᵃ may be sprung outward to disengage the dog and permit it to be swung away, out of engagement with the ratchet teeth 15 of the washer 14. When the dog is out of engagement the nut may be unscrewed, which will cause the washer to travel outward on the bolt, but when the dog is in engagement with the ratchet, the nut will be effectively locked against movement, as will be readily understood.

The described arrangement promotes convenience in assembling the parts, the washer being held on the nut between the flanges, and the arrangement for restraining and for promoting the release of the dog contributes to the practicability of the device.

Having thus described my invention, I claim as new and desire to secure by Letters Patent:—

1. The combination with a bolt having a longitudinal groove in its threaded end, of a nut having a threaded bore for engaging the bolt and having the face of the nut undercut at opposite sides of the bolt forming flanges, one of which flanges has a notch adjacent to one end thereof, and the other of which flanges has a pinhole near the end adjacent to the mentioned notch, a washer having an eye to receive the bolt, a lug fitting the groove of the bolt and ratchet teeth on the periphery, the said washer extending at opposite sides within the undercut portions of the nut, beneath the overhanging flanges, and a spring dog pivoted by one end to one of the flanges by a pin extending through a pinhole thereof, the dog extending at its opposite end beneath the opposed flange at a point outward from the mentioned notch; the nut furthermore having a stop wall at the end of the notched flange adjacent to the said notch, against which wall the free end of the dog abuts, the dog furthermore having a tooth between its ends adapted to engage the ratchet teeth of the washer.

2. The combination with a bolt having a longitudinal groove in its threaded end, of a nut having a threaded bore for engaging the bolt, and being undercut at opposite sides of the bore, thereby forming overhanging flanges, a washer having an eye to receive the bolt and a lug fitting the groove of the bolt, the periphery of the said washer having ratchet teeth extending at opposite sides into the undercut portions of the nut beneath the overhanging flanges, and a spring dog pivoted by one end to one of the flanges and projecting at its opposite end beneath the opposite flange, the said dog having a tooth between its ends adapted to engage the ratchet teeth of the washer, the said free end of the dog engaging a stop member on the nut.

In testimony whereof I have signed my name to this specification in the presence of two subscribing witnesses.

JOHN HERMAN WHITE.

Witnesses:
G. J. LANG,
CLARA HALLEY.

Copies of this patent may be obtained for five cents each, by addressing the "Commissioner of Patents, Washington, D. C."